Patented Feb. 26, 1935

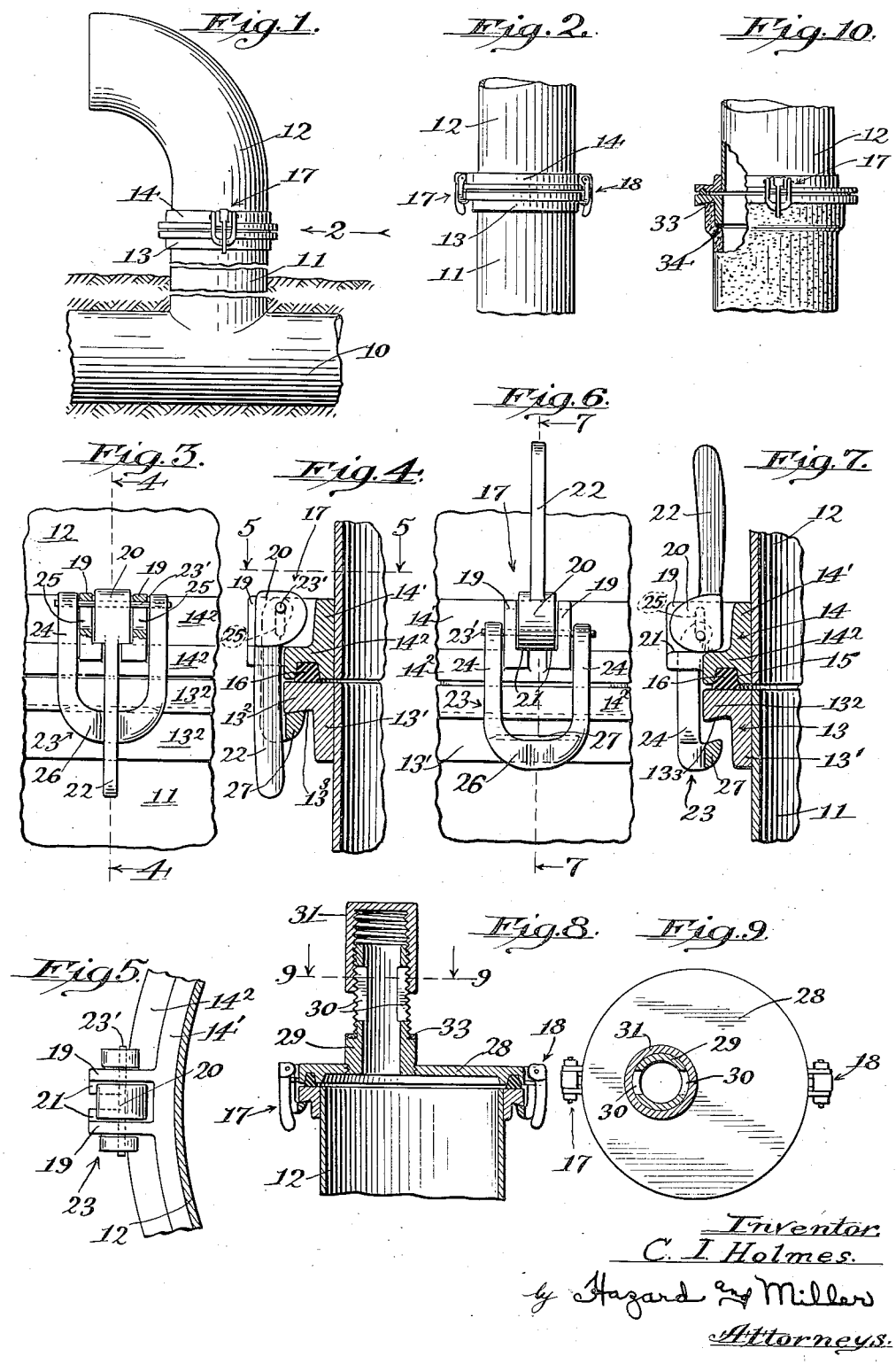

1,992,485

UNITED STATES PATENT OFFICE 1,992,485

PIPE COUPLING

Charles I. Holmes, Chino, Calif., assignor of one-half to Ernest Soper, Chino, Calif.

Application August 21, 1933, Serial No. 686,051

6 Claims. (Cl. 285—171)

My invention relates to a pipe coupling, and while it is of general application, it is especially intended for use in the water distribution from irrigation pipes.

In the irrigation of land it is often desirable to attach pipes to the short vertical branch pipes or nipples of a main pipe to lead the water to points desired. It is an object of this invention to provide pipe coupling means whereby the pipe may be coupled quickly and with a water proof joint to the branch pipes of the main water pipe. In particular, my invention contemplates the use of abutting flanges of the pipes to be coupled provided with a plurality of latches which, by the operation of a cam lever, will lock the latches, fastening one flange to the flange of the other.

With the above and other objects in view, which will appear as the description proceeds, my invention consists in the construction and arrangement of parts hereinafter described and claimed.

In the accompanying drawing I have illustrated a preferred embodiment of my invention, and in which:

Fig. 1 is an elevation of my coupling uniting a pipe with a branch pipe of an irrigation pipe.

Fig. 2 is an elevation taken in the direction of the arrow 2 of Fig. 1.

Fig. 3 is a front elevation of one of the locking mechanisms.

Fig. 4 is a section on the line 4—4 of Fig. 3.

Fig. 5 is a section on the line 5—5 of Fig. 4.

Fig. 6 is a locking mechanism showing the latch unlocked.

Fig. 7 is a section on the line 7—7 of Fig. 6.

Fig. 8 is a modification showing a cap locked to the branch pipe, the cap having a small bow with adjustable outlet ports.

Fig. 9 is a section on the line 9—9 of Fig. 8.

Fig. 10 is a front elevation with parts broken away of an elevation showing a coupling used in connection with a cement branch pipe.

Referring to the drawing, 10 indicates a main irrigation pipe provided at intervals with vertical branch pipes, one of which is indicated at 11. 12 is a pipe to be coupled to the branch pipe 11 by means of my improved devices. Pipes 11 and 12 are made of iron. Their abutting edges are provided with lateral flanges, 13 and 14, respectively. These flanges are, likewise, made of iron and welded on to their respective pipes. Flange 13 is L-shaped in cross section, there being a vertical portion 13' and a horizontally extending portion $13^2$. It should be noted that the under side of the horizontal portion $13^2$ slopes slightly upwardly toward the pipe 11, as indicated at $13^3$. Flange 14 comprises a vertical portion 14' and a horizontal portion $14^2$, the latter having a groove 15 for the reception of a gasket 16 to make the coupling water tight.

At diametrically opposite sides of the flange 14, coupling devices are provided at 17 and 18, both being exactly alike and, therefore, 17 only will be described. The same consists of a pair of spaced lugs 19—19. Snugly mounted between lugs 19—19 is a cam 20 adapted to ride on cam-engaging faces 21—21, formed by the lower ends of the lugs 19—19, which are bent inwardly toward one another. A cam operating handle 22 is secured to the cam and extends forwardly upward, as shown in Figs. 6 and 7, when the coupling is unlocked.

A U-shaped latch 23 depends from a pin 23' passing through and connecting the legs 24 of the latch. The pin 23' passes first through the lugs 19—19, each of which is provided with an elongated slot 25, and through the cam 20. It should be noted that pin 23' passes through the cam 20 eccentrically. The transverse portion 26 of the U-shaped latch 22 is provided with a hook 27 shaped to engage the under side of the lateral portion $13^2$ of the flange 13.

When the pipe 12 is to be coupled to the branch pipe 11, the flanges 13 and 14 and the ends of the pipes 11 and 12 are placed in alignment with the gasket 16 in position in the flange 14. The latch will then be in its lowermost position, as indicated in Figs. 6 and 7, with the cam lever handle 21 extending vertically upward. On turning the handle 21 downwardly so as to describe a half revolution into the position shown in Figs. 3 and 4, the cam 20 riding on the cam-engaging faces 21 will move the pin 23' vertically upward in the slots 25 and move the latch 22 and hook 27 into engagement with the flange 13, thus locking the two pipes together. To release the coupling it is merely necessary to throw the cam lever 21 upwardly to the positions shown in Figs. 6 and 7.

Where the pipe 12 is in the shape of an L it is advisable to have the fastening devices 17 and 18 not diametrically arranged but slightly off center, as shown in Fig. 1, in order to compensate for the additional weight exerted on the coupling by the upper end of the pipe 12.

In Figs. 8 and 9, a slight modification is illustrated, in which, in place of pipe 11, a cap 28 is used, but in other respects the fastening devices 17 and 18 are identical with those described. From the cap 28 a distributing pipe 29 extends.

The same is exteriorly screw-threaded and provided with oppositely disposed outlet ports 30. A valve or closure cap 31 internally threaded is used for either closing the ports altogether or regulating the size of their openings. A gasket 32 is preferably provided on the pipe 29 so as to make a water tight joint when the valve cap 31 is screwed down to its limit.

In Fig. 10 a modification is shown where the branch pipe 11' is made of tile or cement. In this case the upper end of the pipe 11' is flared outwardly for the reception of an L-shaped flange 33 resting on a gasket 34. In other respects the flanges of the pipe 12 and the fastening devices 17 and 18 are identical with those described.

Various changes may be made by those skilled in the art in the construction and arrangement of parts without departing from the spirit of my invention as claimed.

I claim:

1. A pipe coupling comprising a pair of abutting pipes having their abutting ends each provided with a lateral flange, a gasket between the ends of the pipes, and a plurality of flanged locking devices mounted on the flange of one of said pipes, each locking device comprising a pair of spaced lugs having at their lower ends inwardly extending cam-engaging faces, said lugs being provided with slots parallel to the axes of the abutting pipes, a U-shaped latch including two legs and a transverse member, a flange-engaging lip extending laterally from the transverse member, a cam disposed between the lugs, a shaft connecting the upper ends of the legs of the latch and passing through the slots and the cam, and a latch-operating lever operatively connected to the cam.

2. A pipe coupling comprising a pair of abutting pipes having their abutting ends each provided with a lateral flange, and a plurality of flanged locking devices mounted on the flange of one of said pipes, each locking device comprising a pair of spaced lugs provided with elongated slots parallel to the axes of the abutting pipes, a cam disposed between the lugs, a U-shaped latch including two legs and a transverse member provided with means for engaging the under side of the flange of the opposite pipe, a shaft connecting the upper ends of the legs of the latch and passing through the slots of the cam, and a cam-operating lever.

3. A pipe coupling comprising a pair of abutting pipes having their abutting ends each provided with a lateral flange, and a plurality of flanged locking devices mounted on the flange of one pipe for engaging and locking the two flanges together, each locking device comprising a pair of spaced lugs provided with elongated slots, a cam disposed between the lugs, a latch having means for engaging the under side of the opposite flange, a pin passing eccentrically through the cam and through the slots of the lugs and connected to the upper end of a latch, and a lever for operating the cam to lock the two flanges together.

4. A pipe coupling comprising a lower vertical pipe and an abutting upper pipe, said pipes being each provided at their abutting ends with a lateral flange, and a plurality of locking devices mounted on the flange of the upper pipe, each locking device comprising a pair of spaced lateral lugs, said lugs having at their lower ends inwardly extending cam-engaging faces and at their upper ends elongated slots parallel to the axes of the abutting pipes, a U-shaped latch including two legs and a transverse member, the legs straddling the outside of said lugs and the transverse member having a flange-engaging lip extending laterally therefrom, a cam disposed between said lugs, a shaft passing eccentrically through the cam and extending through the slots, the outer ends of the shaft being connected to the legs of the latch, and a handle for operating the cam.

5. A pipe coupling comprising a first pipe and a second pipe, the pipes having their ends abutting, the first pipe being provided with a lateral flange at its abutting end, a plurality of locking devices mounted on the second pipe, each locking device comprising a pair of spaced lugs, a cam disposed between the lugs, a latch depending from the lugs and adapted to engage the lower side of the flange, a cam for moving the latch into flange-engaging position, and a lever for operating the cam.

6. The combination set forth in claim 5 including a U-shaped latch connected to a shaft passing eccentrically through a cam.

CHARLES I. HOLMES.